(12) United States Patent
Campbell

(10) Patent No.: US 9,151,829 B2
(45) Date of Patent: Oct. 6, 2015

(54) PACKAGED RADIATION SOURCE AND DETECTOR

(71) Applicant: STMicroelectronics R&D LTD, Buckinghamshire (GB)

(72) Inventor: Colin Campbell, Strathaven (GB)

(73) Assignee: STMicroelectronics (R&D) Ltd, Buckinghamshire (GB)

( * ) Notice: Subject to any disclaimer, the term of this patent is extended or adjusted under 35 U.S.C. 154(b) by 270 days.

(21) Appl. No.: 13/655,877

(22) Filed: Oct. 19, 2012

(65) Prior Publication Data

US 2013/0099101 A1 Apr. 25, 2013

(30) Foreign Application Priority Data

Oct. 19, 2011 (GB) .................... 1118009.8

(51) Int. Cl.
| | |
|---|---|
| *G01S 7/481* | (2006.01) |
| *G01S 7/486* | (2006.01) |
| *G01S 17/10* | (2006.01) |
| *G01S 7/487* | (2006.01) |
| *G01S 7/497* | (2006.01) |
| *G01J 1/16* | (2006.01) |
| *G01J 1/42* | (2006.01) |

(52) U.S. Cl.
CPC .............. *G01S 7/4813* (2013.01); *G01J 1/1626* (2013.01); *G01J 1/4204* (2013.01); *G01S 7/4814* (2013.01); *G01S 7/4816* (2013.01); *G01S 7/4868* (2013.01); *G01S 7/4876* (2013.01); *G01S 7/497* (2013.01); *G01S 17/10* (2013.01); *Y10T 156/10* (2015.01)

(58) Field of Classification Search
USPC ........ 250/221, 222.1; 382/103, 107; 348/143, 348/152; 340/555–557
See application file for complete search history.

(56) References Cited

U.S. PATENT DOCUMENTS

| | | | |
|---|---|---|---|
| 4,182,977 A | 1/1980 | Stricklin, Jr. | |
| 2006/0050535 A1 | 3/2006 | Chang | |
| 2006/0249663 A1 | 11/2006 | Ewig et al. | |
| 2008/0006762 A1* | 1/2008 | Fadell et al. | ............... 250/201.1 |
| 2008/0173790 A1* | 7/2008 | Cheng et al. | ................... 250/206 |
| 2008/0173963 A1 | 7/2008 | Hsu et al. | |
| 2010/0258712 A1 | 10/2010 | Wiese et al. | |
| 2011/0041350 A1* | 2/2011 | Makimura | .................. 33/366.23 |
| 2011/0057104 A1 | 3/2011 | Yao et al. | |
| 2011/0057129 A1* | 3/2011 | Yao et al. | ....................... 250/552 |

FOREIGN PATENT DOCUMENTS

| | | |
|---|---|---|
| EP | 2264898 A1 | 12/2010 |
| JP | 6281726 A | 10/1994 |
| JP | 2000187786 A | 7/2000 |
| JP | 2004151069 A1 | 5/2004 |
| WO | 2009/104135 A1 | 8/2009 |

* cited by examiner

*Primary Examiner* — Francis M Legasse, Jr.
(74) *Attorney, Agent, or Firm* — Seed IP Law Group PLLC

(57) ABSTRACT

A radiation sensor of the type having a packaged radiation source and detector, which includes an isolator that blocks propagation within the package of radiation from the source to the detector, in order to improve signal to noise ratio of the sensor. The isolator is formed by appropriately formed surfaces of the package.

29 Claims, 10 Drawing Sheets

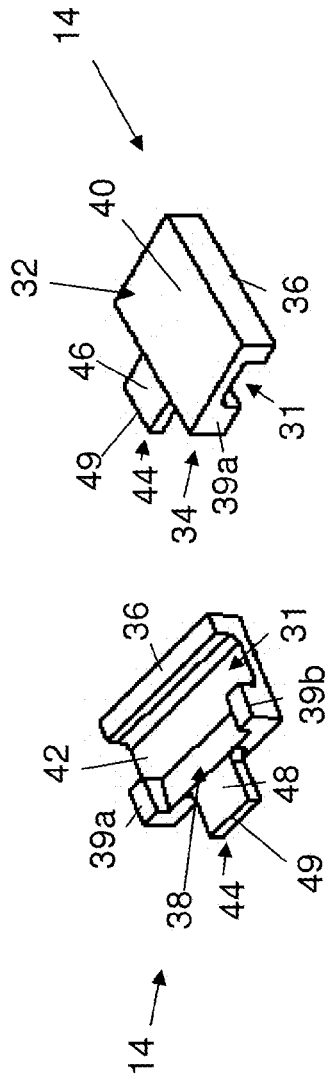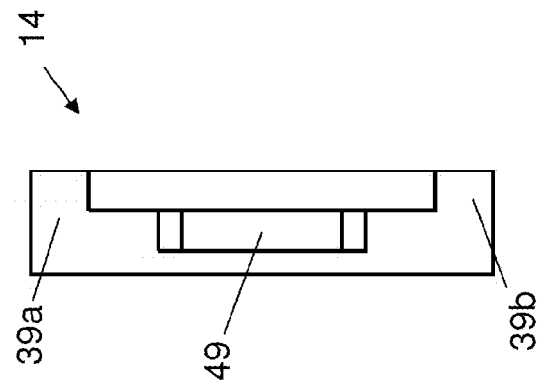

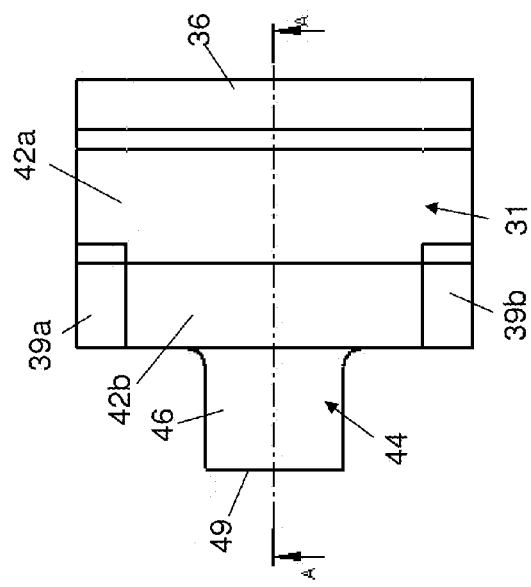
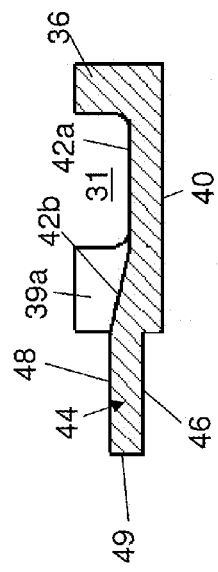
FIG. 6
FIG. 7

PACKAGED RADIATION SOURCE AND DETECTOR

BACKGROUND

1. Technical Field

The disclosure relates to a radiation sensor, a cap, a combined ambient radiation and proximity sensor, a proximity sensor, an electronic communications device and a method of manufacturing a radiation sensor.

2. Description of the Related Art

Proximity sensors are used in many applications, including on mobile communications devices and vehicle parking sensors. Such proximity sensors typically comprise a radiation source and a corresponding detector, the detector comprising a relatively small number of exposed radiation sensitive pixels (e.g. a 10×10 array). Proximity sensing is achieved by: emitting, typically, light from the radiation source; capturing light which is reflected back to the detector by an object; and processing the reflected light to determine whether or not an object is covering the sensor.

Typically, mobile phone proximity sensors work simply by determining the intensity of radiation detected by the radiation sensor. When the intensity is above a threshold value, it is determined that an object is covering the sensor; conversely, when the intensity is below a threshold value, it is determined that no objects are covering the sensor.

Typical uses of a proximity sensor on a mobile phone include providing an indication to a processor that the screen can be switched off to save power when an external object is detected (e.g. when the user is making a call and part of the user's head is near the proximity sensor). Additionally or alternatively, the proximity sensor may provide an indication that some or all of the phone's input controls should be disabled when an external object is detected (e.g. to prevent a user from entering unintentional inputs during a call).

BRIEF SUMMARY

A problem with such simplistic proximity sensors is that, when the amount of light detected by the radiation sensor falls below the threshold level, even for a very small amount of time, the sensor changes state to indicate that an external object is no longer present. This can make the proximity sensors sensitive to minor changes in position. When such sensors are used on mobile phones, minor hand movements by a user during a call can thus inadvertently cause input controls to become activated, allowing the user to unintentionally "hang-up" during a call or enter some other unintentional input (e.g. with their cheek).

It is therefore desirable to provide a proximity sensor which has a simple, inexpensive configuration, but which is less sensitive to minor changes in position.

A first aspect of the disclosure provides a radiation sensor comprising: a first radiation detector; a second radiation detector; an optical isolator; a radiation source; and a cover provided over the radiation source, the cover comprising at least one directing surface, wherein the radiation source and at least one directing surface are together arranged to direct a portion of radiation emitted by the radiation source onto the first radiation detector, and wherein the optical isolator is configured to impede the propagation of radiation between the first radiation detector and the second radiation detector.

At least part of the cover is typically provided directly over the radiation source (i.e. within an imaginary volume which extends up from the perimeter of the radiation source).

At least one of (or part of at least one of) the at least one directing surface may be provided directly over the radiation source.

At least one of (or part of at least one of) the at least one directing surface may be provided not directly over the radiation source.

The cover may, but does not typically, extend over the second detector. Additionally or alternatively, the radiation source and at least one directing surface may be arranged to direct radiation onto the first detector but not onto the second detector.

The cover may be supported by feet which support the cover. Typically, the feet are integrally formed with the cover.

In one embodiment the directing surface may be an upper or lower surface of the cover. Additionally or alternatively, a directing surface may be an interface between two internal regions of the cover (e.g. between upper and lower surfaces of the cover) having different refractive indices.

The radiation source may be an electromagnetic radiation source.

By providing first and second detectors (e.g., a reference detector and a returned radiation detector—see below), a time-of-flight (or phase shift extraction) algorithm may be employed for proximity sensing, rather than an intensity-only type algorithm. This helps to improve the accuracy of the sensor and reduces the sensitivity of such a proximity sensor to small movements. As explained above, this is of particular benefit for use on mobile phones for example. Time-of-flight (or phase shift extraction) algorithms also allow more detailed information (such as the distance of the object from the sensor) to be obtained.

Typically, the first radiation detector is a reference detector. The portion of radiation emitted by the radiation source directed onto the first radiation detector may thus be an "optical start" signal which activates the second radiation detector, for example for proximity sensing.

Typically, the "portion" of radiation being directed onto the first radiation detector is substantially less than all of the radiation emitted by the radiation source.

The optical isolator helps to prevent radiation intended to be incident on the first detector (for example to provide an optical start signal) from propagating onto the second detector. When the radiation sensor is a proximity sensor, this prevents "reference radiation" from being detected as "returned radiation" (i.e. radiation emitted by the radiation source out of the sensor which is reflected or scattered back into the sensor by an external object). Similarly, the optical isolator helps to prevent returned radiation from propagating from the second radiation detector onto the first detector, which may otherwise cause a false "optical start" signal for example.

Preferably, the optical isolator substantially reduces the propagation of radiation between the first radiation detector and the second radiation detector compared to a similar device not having such an optical isolator.

The cover may be part of a sensor package provided to house the first and second radiation detectors and the radiation source. In this case, the optical isolator typically impedes (and preferably prevents) the internal propagation of radiation between the first and second detectors within the sensor package.

Preferably, the at least one directing surface is configured to reflect and/or scatter said portion of said radiation.

Typically, a tab extends laterally from the cover. That is, when the sensor is viewed in plan, the tab protrudes from a side of the cover.

The tab is preferably positioned over the first detector. At least part of the tab is typically provided directly over the first detector.

The tab may comprise part of an optical path between at least one of the at least one directing surface and the first radiation detector.

Preferably, a step is provided between the tab and the cover. This allows optically isolating material (such as black thermosetting or UV curable epoxy) to be provided on the step which helps to prevent returned and ambient radiation from being incident on the first detector. The optically isolating material provided on the step may be substantially flush with the upper face of the cover.

Typically, the step comprises an upper surface of the tab and an upper surface of the cover. In one embodiment, the step comprises an upper surface of the tab and the directing surface. In this case, where optically isolating material is provided on the step, the optically isolating material may be substantially flush with the directing surface.

In a preferred embodiment, the directing surface lies substantially on a first plane and an upper surface of the tab lies substantially on a second plane, the first plane being above the second plane.

Typically the directing surface and the radiation source are together arranged to direct said portion of radiation onto the first radiation detector via an optical path, the portion of the optical path between the directing surface and the first radiation detector being substantially within the cover and/or the tab.

The portion of the optical path between the directing surface and the first radiation detector may comprise a plurality of internal reflections within the cover and/or the tab. In this case, the sensor may comprise a plurality of directing surfaces for guiding said portion of radiation onto the first radiation detector. For example, upper and lower faces of the cover may act as directing surfaces. Additionally or alternatively, upper and lower faces of the tab may act as directing surfaces.

Typically, the cover is provided over a recess in which the radiation source is housed. This helps to make the manufacturing process of the sensor easier as the cap can be installed after the radiation source.

In one embodiment, a second cover may be provided over the second detector. In this case, the optical isolator typically comprises a gap between the cover provided over the first detector and the second cover provided over the second detector. The optical isolator may further comprise an interface between the gap and a distal edge of the tab and/or an interface between the second cover and the gap.

Preferably, the optical isolator comprises an optically isolating material which is substantially opaque to the radiation emitted by the radiation source. For example, the optically isolating material may be a thermosetting (or UV curable) epoxy.

Optically isolating material which is substantially opaque to the radiation emitted by the radiation source may also be provided in the gap between the cover provided over the first detector and the second cover provided over the second detector.

Preferably, the cover can withstand reflow conditions. For example, the cover may comprise or consist of one or more materials with a melting point above 260° C.

It will be understood that the cover preferably comprises or consists of one or more materials which is substantially transparent to the radiation emitted by the radiation source.

The first and/or second radiation detectors may each comprise one or more Single Photon Avalanche Detectors (SPADs).

The radiation source may be, for example, a low power laser diode such as a VCSEL (Vertical Cavity Surface Emitting Laser), or alternatively an LED (Light Emitting Diode) or any other suitable radiation source.

A second aspect of the disclosure provides a cap comprising a cover suitable for use in the radiation sensor of the first aspect of the disclosure, the cover being provided over a recess for housing a radiation source, wherein the cover has at least one directing surface being configured to reflect and/or scatter a portion of radiation incident thereon.

Preferably, the cap further comprises a tab extending laterally from the cover.

A step may be provided between the cover and the tab.

Typically, such a step is provided between an upper surface of the tab and the directing surface.

In one embodiment, at the directing surface of the cover lies substantially on a first plane and an upper surface of the tab lies substantially on a second plane, the first plane being above the second plane.

Typically, the directing surface is an internal surface of the cover.

The cover may comprise an upper face above a lower face and the upper face may comprise at least one of the at least one directing surface.

In one embodiment, the recess extends between a pair of feet arranged to support the cap. One of the feet may comprise a cut-out for receiving part of a circuit board.

At least one of the at least one directing surface may be optically perfect or it may have a surface roughness. Preferably, said directing surface may have a surface roughness of 0.1 μm or less.

In one or more embodiments, the cap may comprise or consist of a material having a melting point above 260° C.

A third aspect of the disclosure provides a proximity sensor comprising: a first radiation detector; a second radiation detector; an optical isolator; a radiation source; and a cover provided over the radiation source, the cover comprising at least one directing surface, wherein the radiation source and at least one directing surface are together arranged to direct a portion of radiation emitted by the radiation source onto the first radiation detector, and wherein the optical isolator is configured to impede the propagation of radiation between the first radiation detector and the second radiation detector.

A fourth aspect of the disclosure provides a combined ambient radiation and proximity sensor comprising: a first radiation detector; a second radiation detector; an optical isolator; a radiation source; and a cover provided over the radiation source, the cover comprising at least one directing surface, wherein the radiation source and at least one directing surface are together arranged to direct a portion of radiation emitted by the radiation source onto the first radiation detector, and wherein the optical isolator is configured to impede the propagation of radiation between the first radiation detector and the second radiation detector.

A fifth aspect of the disclosure provides a mobile communications device comprising: a first radiation detector; a second radiation detector; an optical isolator; a radiation source; and a cover provided over the radiation source, the cover comprising at least one directing surface, wherein the radiation source and at least one directing surface are together arranged to direct a portion of radiation emitted by the radiation source onto the first radiation detector, and wherein the optical isolator is configured to impede the propagation of radiation between the first radiation detector and the second radiation detector.

A sixth aspect of the disclosure provides a method of manufacturing a radiation sensor, the method comprising:

providing a radiation detector;
providing a radiation source;
depositing adhesive on the radiation detector; and
providing a cover over the radiation source, the cover having at least one directing surface, wherein the radiation source and at least one directing surface are together arranged to direct a portion of radiation emitted by the radiation source onto the radiation detector.

Typically, a tab extends laterally from the cover.

In this case, the step of providing the cover over the radiation source may further comprise placing the tab over the radiation detector.

The method may further comprise curing the adhesive.

Preferably, the adhesive is substantially transparent to radiation emitted by the radiation source.

A second radiation detector may be provided. In this case, a second cover may be provided over the second radiation detector, and an optical isolator may be provided to impede the propagation of radiation between the cover and the second cover.

Preferably, an optically isolating material is provided between the cover and the second cover, the optically isolating material being substantially opaque to the radiation emitted by the radiation source. Typically, the optically isolating material provides at least part of the optical isolator.

BRIEF DESCRIPTION OF THE SEVERAL VIEWS OF THE DRAWINGS

Embodiments of the disclosure will now be described, by way of example only, with reference to the drawings, in which:

FIGS. 4A and 4B show respective perspective views of a cap provided over the radiation source of the sensor shown in FIGS. 1-3;

FIG. 5 is an end view of the cap of FIG. 4A;

FIG. 6 is a bottom plan view of the cap of FIG. 4A;

FIG. 7 is a side sectional view of the cap of FIG. 4A taken along lines A-A of FIG. 6.

FIG. 8 is a schematic side sectional view of the sensor of FIGS. 1-3 with the radiation source switched on;

DETAILED DESCRIPTION

Figure 1:
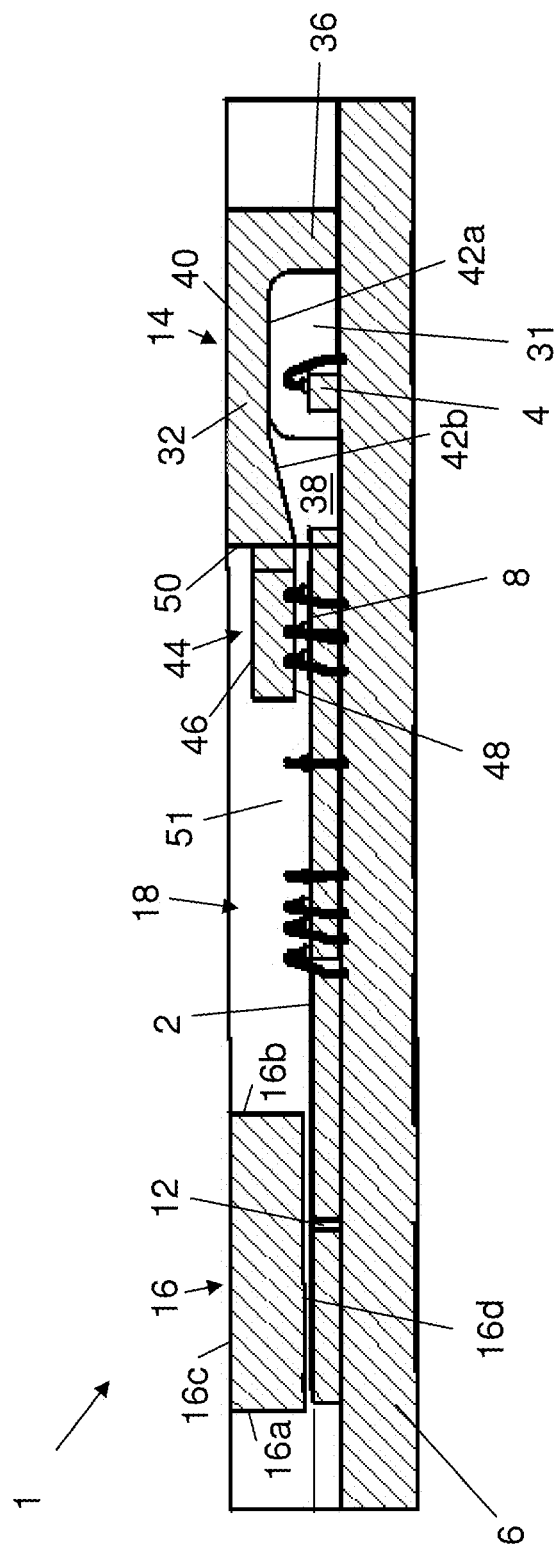
FIG. 1 provides a sectional view through a combined ambient radiation and proximity detector according to an embodiment of the disclosure.
Figure 2:
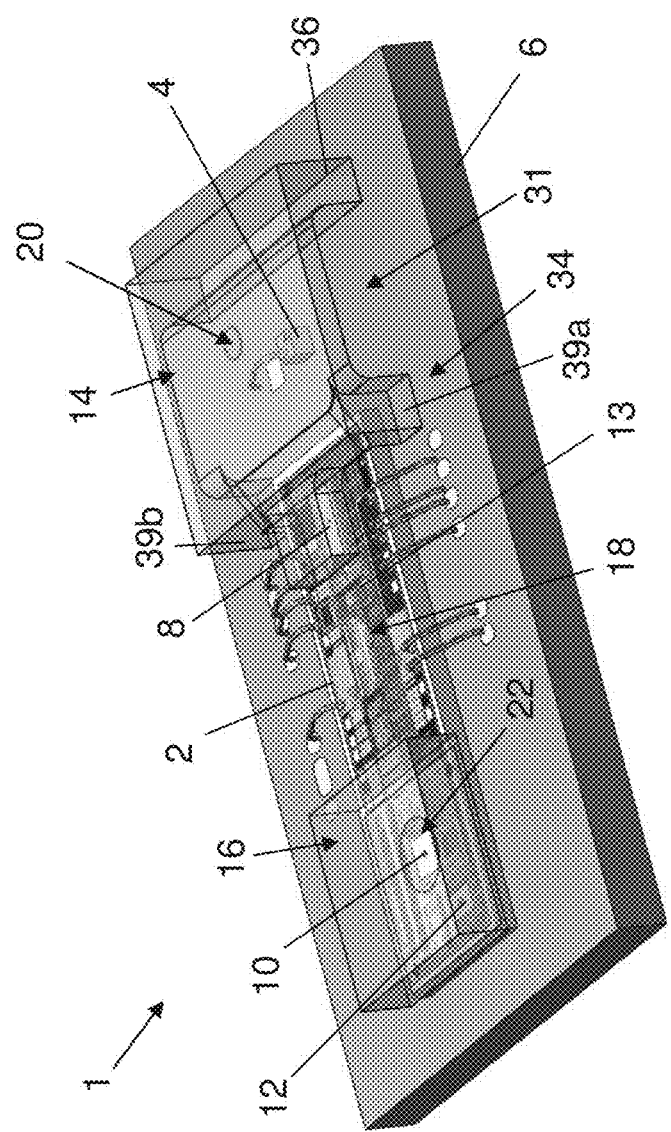
FIG. 2 is a perspective view of the combined ambient radiation and proximity detector of FIG. 1 with overmolding omitted for clarity.
Figure 3:
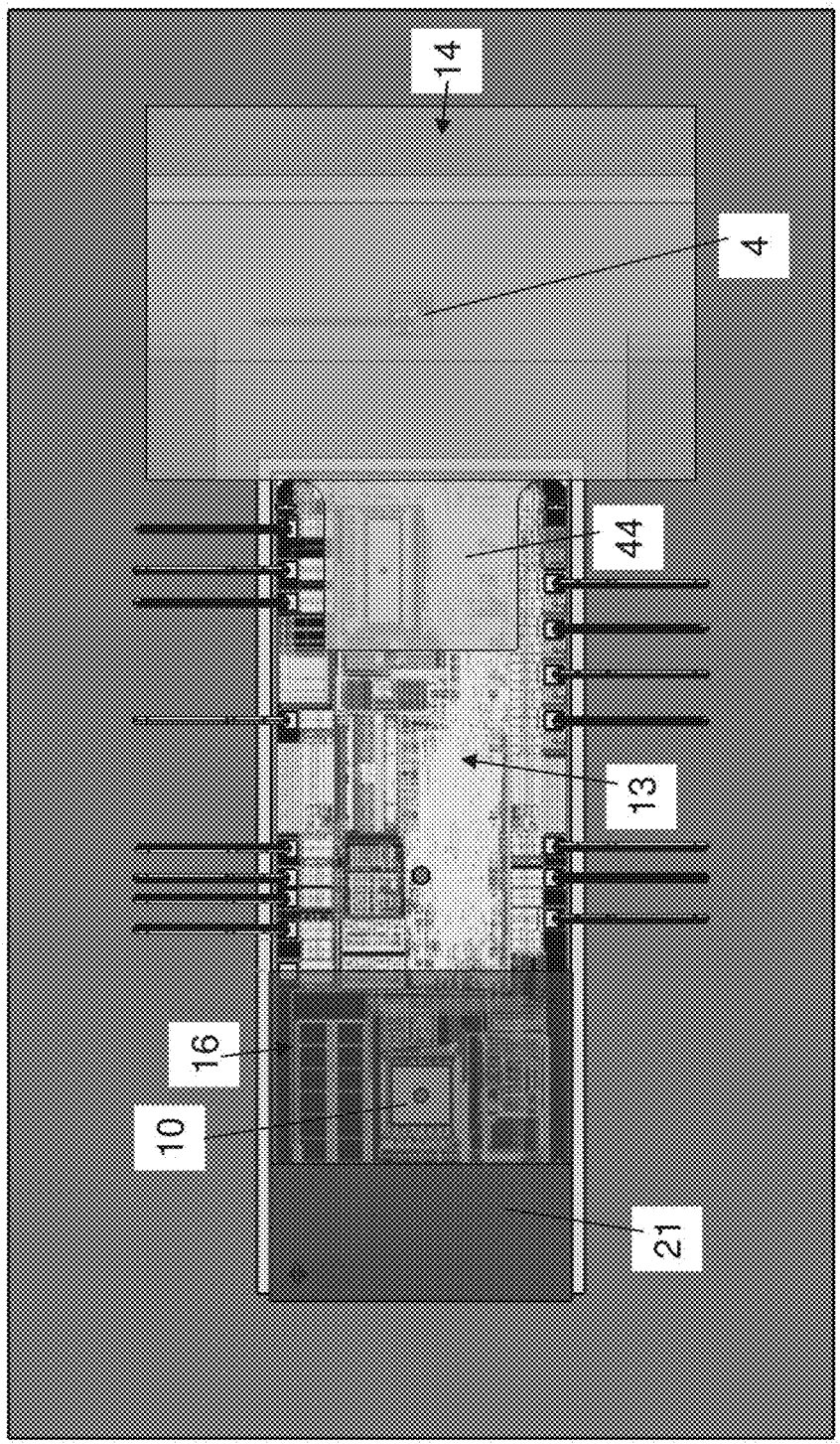
FIG. 3 is a plan view of the combined ambient radiation and proximity detector of FIGS. 1 and 2 again with the overmolding omitted for clarity.

FIGS. 1-3 show a combined ambient radiation and proximity sensor 1 comprising a circuit board 2 and a radiation source 4 (such as an infrared LED or low power laser diode) mounted on a substrate 6. On the circuit board 2 is mounted a reference radiation detector 8, an ambient radiation detector 10, a returned radiation detector 12 and sensor control circuitry 13. The reference, ambient and returned radiation detectors 8, 10, 12 each typically comprise arrays of Single Photon Avalanche Detector (SPAD) pixels, but may alternatively comprise any suitable form of radiation detector (such as an array of complementary metal oxide semiconductor (CMOS) or charge coupled device (CCD) pixels).

A SPAD is based on a (typically CMOS) p-n junction device reverse biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by means of a single incident photon striking the high field region. It is this feature which gives rise to the name 'Single Photon Avalanche Detector'. This single photon detection mode of operation is sometimes referred to as 'Geiger Mode'.

A first cap 14 is provided over the radiation source 4 and the reference detector 8, while a second cap 16 is provided over the ambient and returned radiation detectors 10, 12. A gap 18 is provided between the first and second caps 14, 16. Although a combined ambient radiation and proximity sensor is shown in FIGS. 1-3, it will be understood that the sensor 1 may alternatively be a dedicated proximity sensor (i.e. the ambient radiation detector 10 may be omitted). For brevity, the sensor 1 will be referred to below simply as a proximity sensor.

As most clearly illustrated in FIGS. 4-7, the first cap 14 comprises a body having a recess 31 which defines a cover 32 extending between a pair of feet 34, 36. One foot 36 extends along the length of the cap to support the cover 32. The other foot 34 comprises a cut-out portion (or gap) 38 at an intermediate portion along its length between two remaining supporting portions 39a, 39b. The cut-out portion (or gap) 38 is shaped to receive a portion of the circuit board 2 (as shown in FIG. 1) between the supporting portions 39a, 39b. It will be understood that the cut-out portion 38 is not necessarily formed by cutting out part of the foot 34—for example, the cut-out portion (or gap) 38 may alternatively be formed in the (e.g. molding) process used to form the cap 14.

The cover 32 comprises a first, upper face 40 and a second, lower face 42 connected to (and typically integrally formed with) the first surface 40. The first, upper face 40 is typically substantially flat. The second, lower face 42 comprises a substantially flat portion 42a and a ramped portion 42b which slopes down towards the cut-out (or gap) 38 from the flat portion 42a. The ramped portion 42b of the lower face 42 thus typically forms the upper face of the cut-out (or gap) 38.

The cap 14 further comprises a tab 44 extending laterally from the cover 32. The tab 44 comprises an upper face 46, a lower face 48 and a distal edge 49 extending between the upper and lower faces 46, 48. In the illustrated embodiment, the distal edge 49 is the closest part of the tab 44 to the second cap 16. The lower face 48 of the tab 44 typically extends laterally from the base of the ramped portion 42b of the lower face 42 of the cover 32. As shown most clearly in FIG. 1, the tab 44 extends over the reference detector 8 when the cap 14 is fitted on the proximity sensor 1. The tab 44 thus helps to complete an optical path within the cap 14 from the upper surface 40 of the cover 32 to the reference detector 8.

Typically, the upper face 46 of the tab 44 and the upper face 40 of the cover 32 are substantially planar. The upper face 40 of the cover 32 typically lies on a first plane and the upper surface 46 of the tab 44 typically lies on a second plane below the first plane such that a step 50 is formed between the upper surface 46 of the tab 44 and the upper surface 40 of the cover 32.

The cap 14 is preferably molded in a single monolithic piece such that the cover 32, feet 34, 36 and tab 44 are integrally formed. However, alternatively, the cover 32, feet 34, 36 and/or tab 44 may be separately formed and subsequently bonded or fastened together.

Preferably, the cap 14 is made from a material (or more than one material) which can withstand solder reflow conditions (approximately 260° C. for approximately 30 seconds) during installation. In addition, as radiation must be able to pass through the cap 14 from the radiation sensor 2 (see below), the cap 14 (or at least the cover 32) should be made from a material which is substantially transparent to radiation emitted by the radiation source 4. When the radiation source 4 is a VCSEL emitting infrared radiation at 850 nm, suitable materials for the cap 14 include Dupont 500A and Sabic EXTEM XH1005.

The second cap 16 may simply comprise a monolithic block of material which is substantially transparent to the radiation emitted by the radiation source and, preferably, to visible ambient radiation. In the illustrated embodiment, the second cap 16 comprises a cuboid having first and second side faces 16a, 16b extending substantially perpendicularly between substantially planar upper and lower faces 16c, 16d. However, it will be understood that any suitable shape may be used. Again, the second cap 16 should comprise or consist of material which can withstand reflow conditions. Such materials include glass (e.g. Schott D263) or the same material used for the first cap 14 (e.g. Dupont 500A and Sabic EXTEM XH1005).

As shown most clearly in FIG. 2, the first cap 14 may further comprise a collimating lens 20 configured to collimate radiation emitted by the radiation source 4. In addition, the second cap 16 may comprise a focusing lens 22 configured to focus returned radiation onto the ambient radiation detector 10 and/or the returned radiation detector 12. As shown in FIG. 3 a filter 21 may also be provided over the returned radiation detector 12, the filter 21 having a pass-band which is matched to the emission spectrum of the radiation source 4. Such a filter 21 prevents the returned radiation detector 12 from detecting ambient visible radiation, for example, which could cause false detections to occur.

As shown in FIG. 1, an overmolding 51 may be provided in the gap 18 and around the external side of the foot 36 of the first cap 14 and the external side of first side face 16a of the second cap 16. Typically, the overmolding 51 does not extend over the upper faces of the caps 14, 16, but it does extend over the upper surface 46 of the tab 44 to fill the step 50. Preferably, the overmolding 51 comprises an optically isolating material (e.g. a black thermosetting epoxy molding compound such as Sumitomo BAKELITE) which is substantially opaque to radiation emitted by the radiation source 4.

The portion of the overmolding 51 provided on the step 50 minimizes the amount of returned and ambient radiation impinging on the reference detector 8 (which could otherwise cause false optical start signals to be detected). In addition, because the overmolding 51 does not extend over the upper face 40 of the cap 14 or the upper face 16c of the second cap 16, radiation can escape from the cap 14 and impinge on the returned radiation detector 12 for proximity detection.

Figure 8:
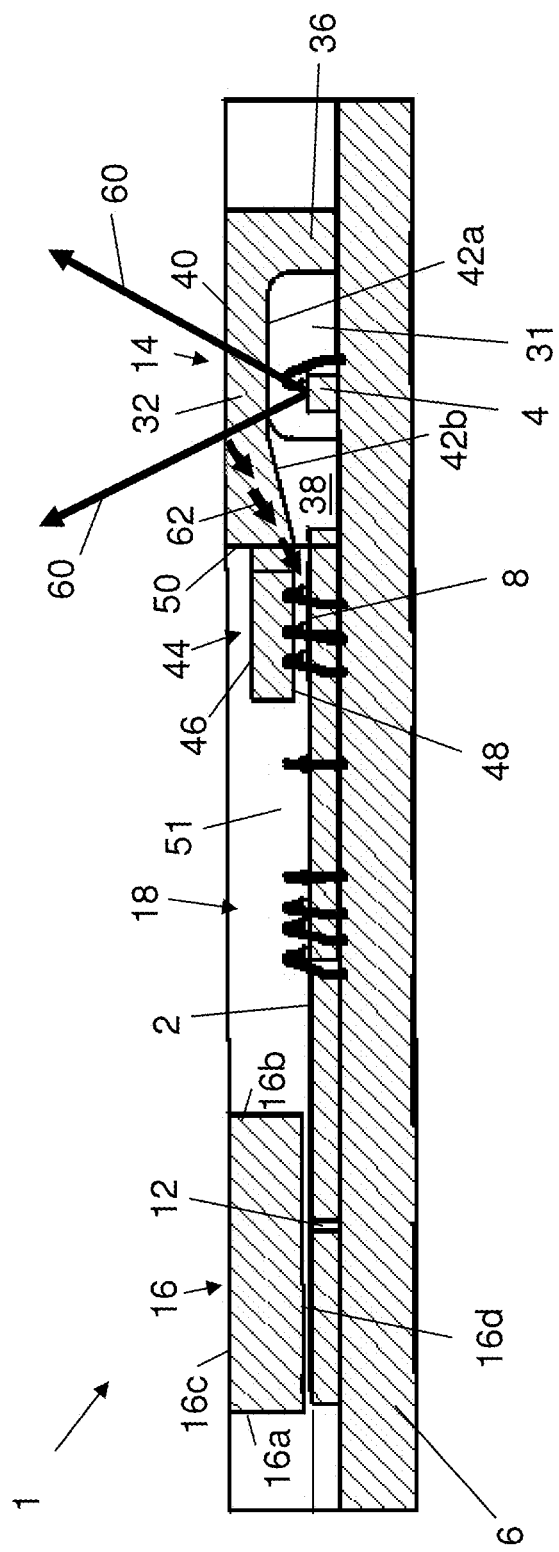

FIG. 8 is a schematic illustration of the proximity sensor 1 of FIG. 1 with the radiation source 4 switched on. Radiation 60 is emitted by the radiation source 4 through the lower face 42 into the cover 32 of the cap 14 towards its upper face 40. When the radiation 60 meets the upper face 40 of the cover 32, the surface roughness of the upper face 40 causes a small portion 62 of the radiation 60 emitted by the radiation source 4 to be scattered back into the cap 14 and onto the reference detector 8, typically through the tab 44. The scattered radiation 62 is illustrated by dotted lines in FIG. 8. Part of the internal surface of the upper face 40 thus acts as a directing surface configured to direct a portion of radiation emitted by the radiation source 4 onto the reference detector 8 (but not onto the returned radiation detector 12). As shown in FIG. 8, although the directing surface is part of the cover 32 over the radiation source 4, the directing surface is not provided directly over the radiation source in this embodiment (although it may be in other embodiments).

It will be understood that the upper surface 40 of the cover 32 does not need to have a surface roughness and may in theory even be optically perfect. In this case, the upper surface 40 may totally internally reflect a portion of radiation emitted by the source 4 onto the reference detector. Typically, a surface roughness of 0.1 μm or less may be employed. Additionally or alternatively, a reflector (such as a small portion of aluminum) may be provided on the upper face 40 or internal to the cover 32. The reflector on the upper face 40 and/or the internal reflector may thus act as a directing surface configured to direct a portion of radiation emitted by the radiation source 4 onto the reference detector 8.

When the radiation source 4 is pulsed (or modulated) on, the scattered (or reflected) radiation directed by the cover 32 onto the reference detector 8 prompts the sensor control circuitry 13 to determine a "transmit" (or "start") time, T0, indicating when the radiation was emitted by the radiation source 4. The scattered (or reflected) radiation 62 directed onto the reference detector 8 thus provides the proximity sensor 1 with an "optical start" signal. Typically, a predetermined time window is set, starting from T0, within which radiation must be detected by the returned radiation detector 12 in order for the sensor 1 to indicate that an object has been detected.

The radiation emitted by the radiation source 4 which is not scattered or reflected by the surface 40 is transmitted through the upper face 40 and out of the cap 14. When an external object is near the sensor 1 (e.g. when the proximity sensor is installed on a mobile phone, the external object may be a user's cheek/ear/head when the user is making a call), a portion of the radiation emitted by the source 4 is reflected or scattered by the external object onto the returned radiation detector 12. When the radiation reflected or scattered by the external target object is received by the returned radiation detector 12, the sensor control circuitry 13 determines a receive time, T1, which varies according to the distance between the sensor and the external object. If T1 is within the predetermined time period starting from T0, a "detect" signal is output by the sensor.

Importantly, the "optical start" signal allows the proximity sensor to function on a time-based algorithm rather than an intensity-based algorithm. That is, as long as radiation is detected by the returned radiation detector 12 within the predetermined time window starting from the optical start signal, the proximity sensor 1 indicates that an object is near. No arbitrary intensity thresholds need to be set. This makes the proximity sensor 1 less sensitive to minor changes in position. Such a time-based algorithm also allows more complex proximity information to be derived. For example, the difference between T0 and T1 (along with the speed of light)

can be used to determine the distance of the target object from the sensor. This is not possible with simple intensity-based sensors.

In one embodiment, the returned radiation detector 12 may only be activated within the predetermined time window to minimize the number of false readings being sent to the sensor control circuitry 13.

As explained above, the filter 21, having a pass-band which is matched to the emission spectrum of the radiation source 4 (which typically emits in the infrared spectral region), substantially reduces (or even eliminates) the detection of visible ambient radiation by the returned radiation detector 12 in order to substantially reduce (or even prevent) false readings by the proximity sensor as a result of the detection of ambient radiation.

As shown most clearly in FIGS. 1-3, the gap 18 between the two caps 14, 16 typically extends between the distal edge 49 of the tab 44 and the second cap 16. The gap 18 acts as an optical isolator substantially reducing the propagation of radiation between the reference detector 8 and the returned radiation detector 12. More specifically, when radiation propagating within the tab 44 is incident on the interface between the distal edge 49 and the gap 18, the radiation will either be totally internally reflected back into the tab 44 or propagate out of the tab 44. In the latter case, the radiation will be absorbed by the overmolding 51.

Similarly, radiation incident on the interface between the second cap 16 and the gap 18 will either be totally internally reflected back into the cap 16 or it will propagate out of the cap 16. In the latter case, the radiation will again be absorbed by the overmolding 51.

In addition, any radiation emitted by the radiation source 4 which is reflected back onto the overmolding 51 will be absorbed. Thus, the portion of the optically isolating overmolding 51 provided on the step 50 between the upper face 40 of the cover 32 and the upper face 46 of the tab 44 helps to prevent returned radiation from impinging on the reference detector 8.

The optically isolating overmolding 51 is of particular importance when the reference detector 8 and returned radiation detector 12 comprise SPADs. This is because SPADs can detect the presence of single photons of radiation and are thus less tolerant to optical noise.

It will be understood that some or all of the scattered radiation 62 may follow a direct path through the cap onto the reference detector 8. It will also be understood that some or all of the scattered radiation may be directed onto the reference detector 8 via an indirect path. For example, the scattered radiation may be reflected (e.g. by total internal reflection) a plurality of times within the cover 32 (and/or the tab 44) before being incident on the reference detector 8. In this case, both the upper and lower faces 40, 42 of the cover (and/or the upper and lower faces 46, 48 of the tab 44) may act as directing surfaces configured to direct a portion of radiation emitted by the radiation source 4 onto the reference detector 8.

It will be understood that, instead of using the time-based approach described above, the proximity sensor alternatively may use the phase shift extraction method described below. The optical start signal can also be used to initiate this method, and begin a time window within which the returned radiation detector 12 is activated.

Phase Extraction Method

The phase extraction method is favored for SPADs in proximity detection applications and is well suited to systems which implement computation of the generalized range equation (see below). It is also typically robust to background ambient light conditions, and may be adapted to allow for varying modulation wave-shapes (i.e. sinusoidal or square).

The range equation derivation explained below shows the ease of applicability of SPADs to phase extraction proximity detection.

Distance is determined from the speed of light and time of flight (TOF), as follows:

$$s = ct$$

where s is distance, c the speed of light and t is time.

For a proximity sensing system, the distance is doubled due to the fact there are send and receive paths. As such the distance measured in a ranging system s is given by:

$$s = \tfrac{1}{2} ct$$

The time component (='t') due to the photon TOF is determined based on the modulation frequency $f_{mod}$ and phase shift magnitude of the received waveform relative to the transmitted waveform.

$$t = \%\text{ shift of the returned waveform} \times t_{mod\_period}$$

and if $t_{mod\_period} = 1/f_{mod}$:

$$\Rightarrow t = \frac{\phi}{2\pi} \circ \frac{1}{f}$$

$$\Rightarrow t = \frac{\phi}{2\pi \circ f}$$

The units are in radians. Then by substituting the above equation back into the starting equation, the 'range equation' is expressed as:

$$\Rightarrow s = \frac{c \circ \phi}{4\pi \circ f}$$

The component of interest in this equation is φ, which is the % shift of the returned waveform. Stated differently, φ is the angle of the phase shift of the returned waveform, and will range between 0 and 2π radians. The following section discusses how this can be determined.

Since the values of c, f and π are all constants; the range result simply scales with φ, (the % shift of the received light waveform in relation to that which was transmitted).

Figure 9:
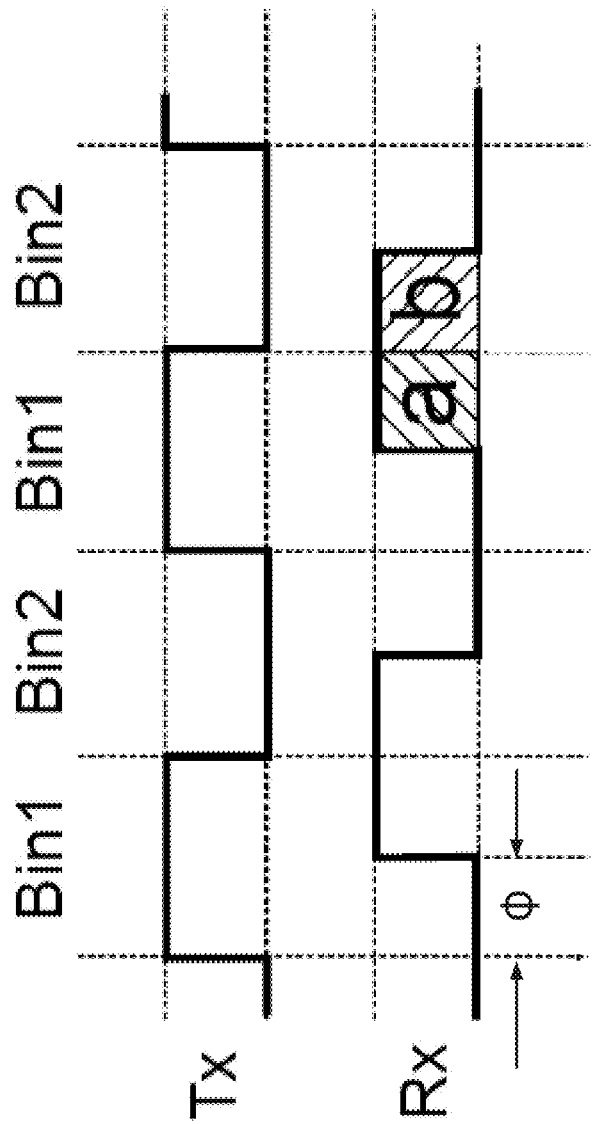
FIG. 9 is a wave diagram illustrating the Phase Shift Extraction Method, according to an embodiment.

FIG. 9 demonstrates how φ may be determined for a system employing modulating the radiation source 4 with a square wave. The transmitted waveform Tx emitted by the radiation source 4 and the received waveform Rx (i.e. received at the returned radiation detector 12) are shifted from one another by φ. By measuring the photons that arrive in "a" and "b" in bins 1 and 2 respectively the value of φ can be determined as follows:

$$\frac{\phi}{2\pi} = \frac{b_{count}}{(a+b)_{count}} \cdot d$$

Bin 1 represents the photons detected during the "ON" period of Tx, bin 2 represents the photons detected during the "OFF" period of Tx, and d is the duty cycle of the waveform, i.e., the fraction or percentage of a complete cycle of the waveform occupied by the ON period of the waveform. Dividing b by (a+b) produces a percentage of the ON period of Rx that is detected after the ON period of Tx has ended.

Multiplying the resulting value by the duty cycle of the waveform produces a percentage of the waveform period by which Rx is shifted.

Assuming, for example, a 50% duty cycle, and that a and b are approximately equal, the equation set forth above will show a phase shift of 25%, or 1.57 radians. This value can then be inserted at $\phi$ in the preceding equation to determine the distance to the external object.

It will be understood that, although only 2 bins are illustrated in this example, it is preferable for more bins to be employed to improve accuracy.

In this type of system there is a range limit set by the radiation source modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform in order to accumulate data for averaging purposes as fast as possible. However, a high modulation frequency may lower the unambiguous range and introduces more technical complexity in the driver circuitry of the radiation source 4. Therefore, two or more different modulation frequencies may be interleaved or used intermittently, so as to reduce or negate the impact of aliased photons via appropriate data processing.

Figure 10A:
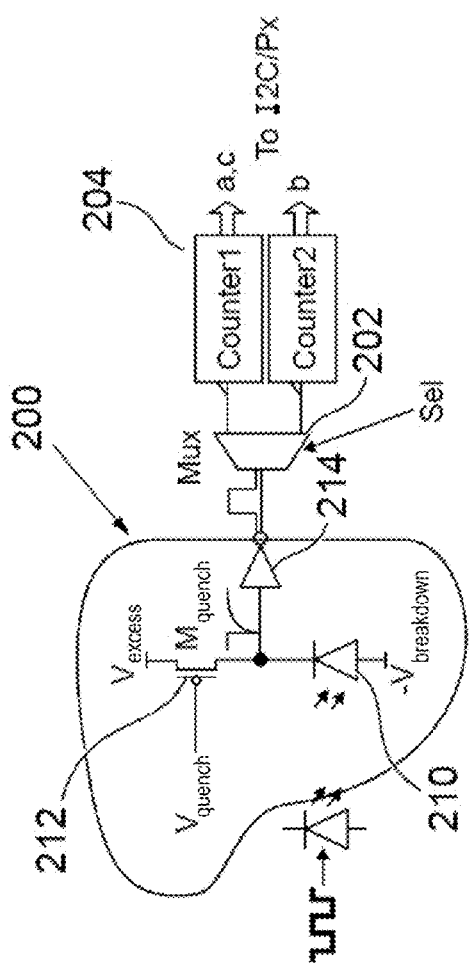
FIG. 10A illustrates an implementation of a SPAD based proximity sensor according to an embodiment.
Figure 10B:
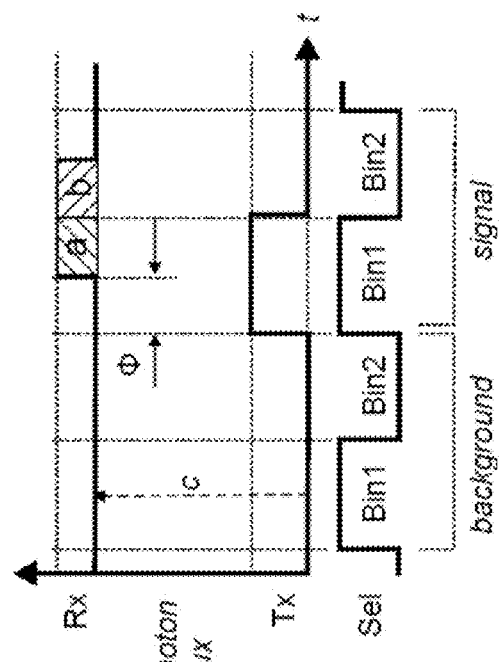
FIG. 10B is a waveform diagram associated with the proximity sensor shown in FIG. 10A.

FIGS. 10A and 10B illustrate a possible implementation of a SPAD based proximity sensor with an associated waveform diagram. FIG. 10A shows a SPAD 200 (as part of the returned radiation detector 12) connected to a multiplexer 202. The output from the multiplexer passes through counters 1 and 2 (204). The SPAD shown generally at 200 is of a standard type, including a photo-diode 210, a p-type MOSFET 212 and a NOT gate 214.

The timing waveforms of FIG. 10B are shown in such a way so as to represent the relative photon arrival magnitudes. It can be seen that the duty cycle has been reduced to enable computation of the background ambient light level offset 'c', by providing an extended OFF period of the waveform so that portions of the OFF periods of Tx and Rx overlap for a duration at least equal to the duration of the ON period. During the overlap, only ambient light will be received by the returned radiation detector 12, although as mentioned above, ambient radiation interference can be significantly reduced by the use of the narrow optical band-pass filter 21 matched to the wavelength of the radiation source 4. The element 'c' can be determined by deactivating the radiation source 4 and measuring the photon flux at the returned radiation detector 12. If a narrow-band IR filter is employed in the optical path (as is commonly the case), the value of c will represent only the ambient content of the filter pass-band. This measurement of 'c' is then accommodated in the computation of received light phase shift $\phi$.

It is noted that the shot noise produced by the SPAD is proportional to the number of electrons it generates. Therefore, the greater the in-band ambient light signal detected by the returned radiation detector 12, the greater the shot noise. It is therefore preferable that the field of view of the returned radiation detector 12 is restricted to minimize the amount of in-band ambient radiation detected during proximity sensing so as to minimize shot noise. This decreases the detection time necessary to average out the noise and thus improves the performance of the ambient light sensing function.

The computed results for a, b, c are determined and written into either a temporary memory store or an Inter-Integrated Circuit (I2C) register (it will be understood that alternative protocols to I2C may be used). The computation of the phase shift $\phi$, is calculated as follows:

$$\frac{\phi}{2\pi} = \frac{b_{count} - c}{(a+b)_{count} - 2c} \cdot d$$

The predetermined selection of modulation frequency is performed by dedicated logic or host system which selects a suitable frequency or frequencies for the application of the range sensor. The proximity sensor of FIG. 10A is dependent on the amount of light that can be transmitted on to the scene, system power consumption and the target reflectivity.

Figure 11:
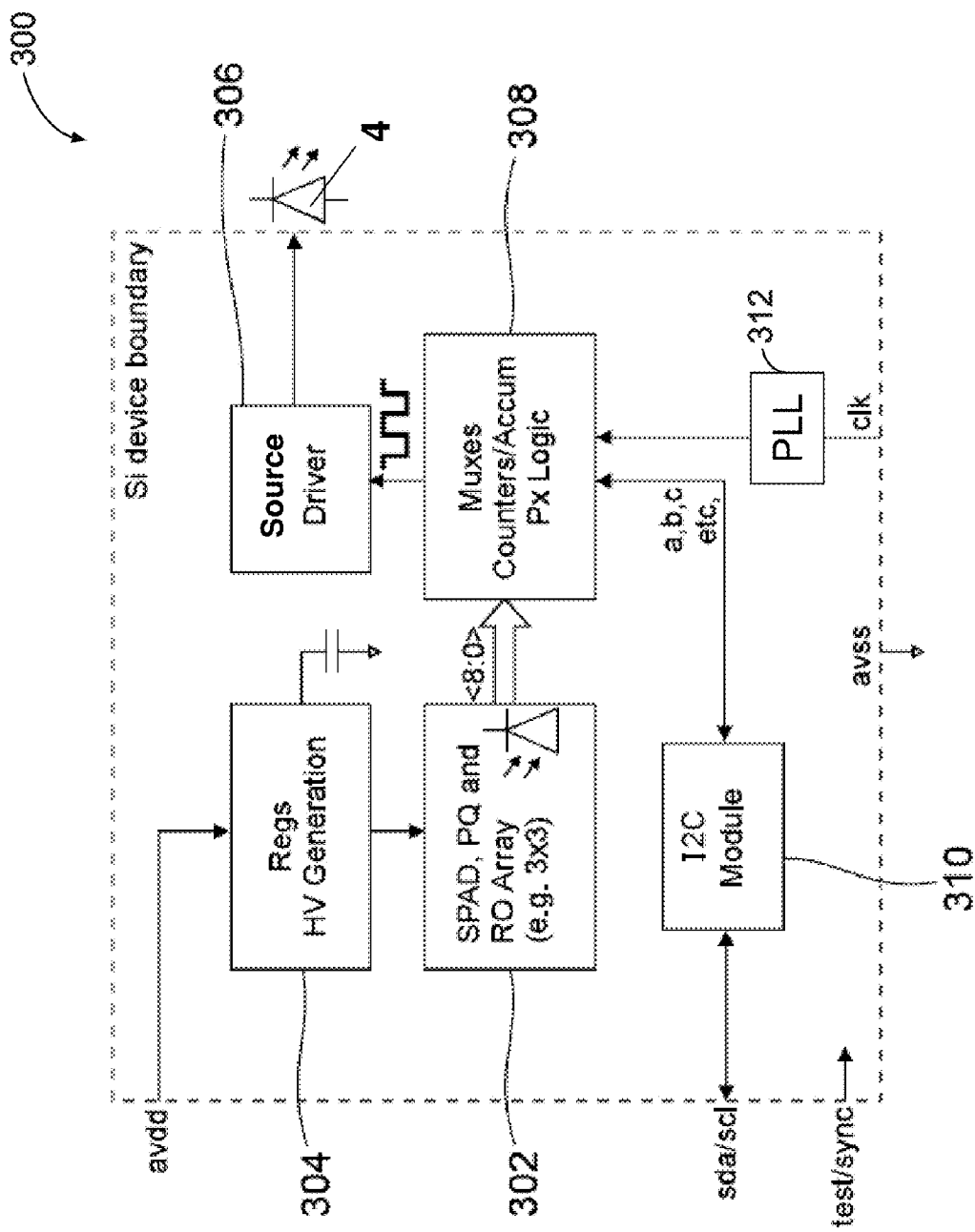
FIG. 11 is a block diagram of a SPAD based proximity sensor according to an embodiment.

A block diagram of the preferred elements for the proximity sensing function of a sensor like that shown in FIGS. 1-3, where the returned radiation detector 12 is a SPAD array, is shown in FIG. 11. The proximity sensor 300 includes SPAD function and the quenching thereof in block 302. The quenching can be passive as shown or of any other suitable type. The bias voltage for the SPAD may be provided by a charge pump or any other suitable device 304. The sensor also includes the radiation source 4 and an associated driver 306 for applying a modulation signal to the radiation source.

It should be noted that the optical start signal could be produced in other ways than those described above. For example the optical start signal may commence when a pulse returns to the detector 12 and finishes when the next pulse is sent out by source 4. Similarly other ways of, and timings for, producing the optical start signal can be imagined.

The sensor also includes multiplexers and counters 308 and a storage means 310, such as a I2C module. The sensor may also include a phase locked loop (PLL) 312 for clocking and subsequent timed signal generation purposes.

The power consumption of SPADs and their readout circuits is dependent on the incident photon arrival rate. The average power consumption of the proximity sensing function may be reduced by using power saving modes such as pulsed on/off operation, at a rate of ~10 Hz for example, at the expense of target motion distortion.

The returned radiation detector 12 may be implemented on a 1 mm$^2$ die size and the I2C module could also be implemented on an appropriate die.

It should be noted that the terms "optical", "illumination" and "light" are intended to cover other wavelength ranges in the spectrum and are not limited to the visual spectrum.

Method of Manufacturing Proximity Sensor

The proximity sensor shown in FIGS. 1 and 8 can be manufactured using the following procedure. Firstly, the reference and returned radiation detectors 8, 12 (and optionally the ambient radiation sensor 10) are mounted to the circuit board 2. Next, the circuit board 2 and the radiation source 4 are mounted to the substrate 6. Next, adhesive is applied to the reference and returned radiation detectors 8, 12. The first cap 14 is then installed such that the tab 44 is placed on the adhesive layer over the reference detector 8, the radiation source 4 is housed in the recess 31, and part of the circuit board 2 is received in the cut-out 38 in foot 34. The second cap 16 is also installed such that it is positioned on the adhesive layer covering the returned radiation detector 12. Next, the adhesive is cured, for example by applying heat or UV light thereto.

It will be understood that the reference and returned radiation detectors 8, 12 may alternatively be mounted to the circuit board 2 after the circuit board is mounted to the substrate 6.

It will also be understood that the adhesive is substantially transparent to radiation emitted by the radiation source 4, to prevent a loss of radiation power being emitted from the source 4. Any thermal or UV curing adhesive substantially transparent at the emission wavelength(s) of the radiation source 4 would be suitable.

In a further step, the sensor may preferably be partially encapsulated in the optically isolating overmolding 51 which, as explained above, comprises a material which is substantially opaque to the radiation emitted by the radiation source 4. The overmolding 51 should be provided in the gap 18 between the first and second caps 14, 16 to better optically isolate the reference detector 8 from the returned radiation detector 12 as discussed above. In addition, the overmolding 51 should extend over the step 50. However, the should not extend over the upper surface 40 of the cap 14 or the upper surface of the second cap 16 in order to allow radiation to propagate between the radiation source 4 and the returned radiation detector 12 (via an external object) during proximity sensing.

The overmolding 51 may be applied by depositing a liquid or gel optically isolating material on the relevant portions of the package before curing (e.g. by heating or application of UV light).

Figure 12:
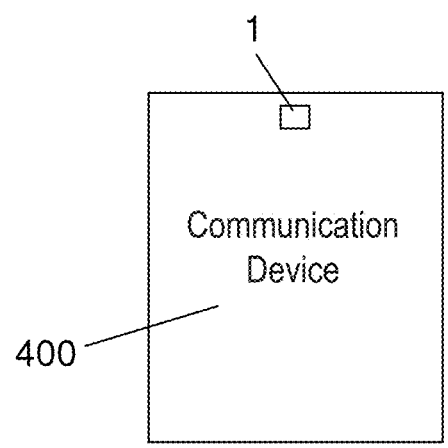
FIG. 12 shows an electronic communications device comprising the combined ambient radiation and proximity sensor of FIGS. 1-3, 8.

FIG. 12 shows an electronic communications device 400, such as a mobile phone, comprising the combined proximity and ambient radiation sensor 1 described above.

While this detailed description has set forth some embodiments of the present disclosure, the appended claims cover other embodiments of the present disclosure which may differ from the described embodiments according to various modifications and improvements.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A proximity sensor comprising:
a first radiation detector;
a second radiation detector;
an optical isolator configured to impede radiation from propagating between the first radiation detector and the second radiation detector;
a radiation source;
a first cover provided over the radiation source, the first cover including a directing surface, wherein the radiation source and directing surface are together arranged so that the directing surface reflects a portion of radiation emitted by the radiation source directly onto the first radiation detector via an optical path, a portion of the optical path between the directing surface and the first radiation detector being substantially within the first cover, wherein an optical start signal is generated to initiate a time period for proximity sensing.

2. The proximity sensor of claim 1 wherein the first radiation detector is configured to provide, in response to the portion of radiation, the optical start signal.

3. The proximity sensor of claim 1 comprising a cap, of which the first cover is a part, the cap further including a tab extending laterally from the cover.

4. The proximity sensor of claim 1 wherein the portion of the optical path between the directing surface and the first radiation detector comprises a plurality of internal reflections within the first cover.

5. The proximity sensor of claim 1 wherein the first cover is positioned over a recess in which the radiation source is housed.

6. The proximity sensor of claim 1, further comprising a second cover positioned over the second radiation detector.

7. The proximity sensor of claim 1 wherein the optical isolator comprises an optically isolating material which is substantially opaque to the radiation emitted by the radiation source.

8. The proximity sensor of claim 1 wherein the first cover is substantially transparent to the radiation emitted by the radiation source.

9. The proximity sensor of claim 1 wherein the first and second radiation detectors each comprise one or more Single Photon Avalanche Detectors.

10. The proximity sensor of claim 3 wherein the tab is positioned over the first detector.

11. The proximity sensor of claim 3 wherein the cap includes a step between the tab and an upper face of the first cover.

12. The proximity sensor of claim 11 wherein the directing surface lies substantially in a first plane and an upper surface of the tab lies substantially in a second plane, the first plane being above the second plane.

13. The proximity sensor of claim 11, further comprising optically isolating material, which is substantially opaque to radiation from the radiation source, positioned over the step.

14. The proximity sensor of claim 6 wherein the optical isolator comprises a gap between the first cover and the second cover.

15. The proximity sensor of claim 14, comprising optically isolating material, which is substantially opaque to the radiation emitted by the radiation source, positioned in the gap between the first and second covers.

16. The proximity sensor of claim 7 wherein the optically isolating material is a thermosetting or UV curable epoxy.

17. A device comprising:
a substrate;
a first radiation detector coupled to the substrate;
a second radiation detector coupled to the substrate;
an optical isolator configured to impede radiation propagation between the first and second radiation detectors;
a radiation source coupled to the substrate;
a cover coupled to the substrate and positioned over the radiation source and adjacent to the first radiation detector, the cover having a directing surface configured to reflect a portion of radiation emitted by the radiation source directly onto the first radiation detector; and
a proximity sensor circuit coupled to the substrate and electrically coupled to the radiation source and the first and second radiation detectors, the proximity sensor circuit being configured to determine a proximity of an external object based on radiation emitted by the radiation source and detected by the first and second radiation detectors.

18. The device of claim 17, comprising a mobile communications device, and wherein the substrate, the first and second radiation detectors, the radiation source, and the proximity sensor circuit are coupled to the mobile communications device and configured to determine a proximity of the external object to the mobile communications device.

19. The device of claim 17 wherein the proximity sensor circuit is configured to receive a start signal from the first radiation detector and to determine the proximity of the external object based on a time difference between a signal emitted by the radiation source and a reflection of the signal detected by the second radiation detector.

20. The device of claim 17 wherein the proximity sensor circuit is configured to receive a start signal from the first radiation detector and to determine the proximity of the external object based on a phase shift of a reflection of a signal emitted by the radiation source and detected by the second radiation detector, relative to the emitted signal.

21. The proximity sensor of claim 17, wherein the second radiation detector is configured to receive a return pulse of the radiation emitted by the radiation source and provide an optical start signal in response to receiving the return pulse; and the proximity sensor circuit is configured to receive the optical start signal and begin a period for determining the proximity of the external object in response to receiving the optical start signal.

22. A proximity sensor comprising:
a first radiation detector;
a second radiation detector;
an optical isolator configured to impede radiation from propagating between the first radiation detector and the second radiation detector;
a radiation source;
a first cover provided over the radiation source, the first cover including a directing surface, wherein the radiation source and directing surface are together arranged so that the directing surface reflects a portion of radiation emitted by the radiation source directly onto the first radiation detector, wherein an optical start signal is generated to initiate a time period for proximity sensing and the second radiation detector is configured to receive a return pulse of the radiation emitted by the radiation source and provide the optical start signal in response to receiving the return pulse.

23. The proximity sensor of claim 22 wherein the portion of the optical path between the directing surface and the first radiation detector comprises a plurality of internal reflections within the first cover.

24. The proximity sensor of claim 22 wherein the optical isolator comprises an optically isolating material which is substantially opaque to the radiation emitted by the radiation source.

25. The proximity sensor of claim 22 wherein the first cover is substantially transparent to the radiation emitted by the radiation source.

26. A proximity sensor comprising:
a first radiation detector;
a second radiation detector;
an optical isolator configured to impede radiation from propagating between the first radiation detector and the second radiation detector;
a radiation source;
a first cover provided over the radiation source, the first cover including a directing surface lying substantially in a first plane, wherein the radiation source and directing surface are together arranged so that the directing surface reflects a portion of radiation emitted by the radiation source directly onto the first radiation detector, wherein an optical start signal is generated to initiate a time period for proximity sensing; and
a cap, of which the first cover is a part, the cap further including a tab extending laterally from the cover and including a step between the tab and an upper face of the first cover, an upper surface of the tab lying substantially in a second plane, the first plane being above the second plane.

27. The proximity sensor of claim 26 wherein the portion of the optical path between the directing surface and the first radiation detector comprises a plurality of internal reflections within the first cover.

28. The proximity sensor of claim 26 wherein the first cover is positioned over a recess in which the radiation source is housed.

29. The proximity sensor of claim 26, further comprising a second cover positioned over the second radiation detector.

* * * * *